US 6,499,929 B1

(12) United States Patent
Salgado et al.

(10) Patent No.: US 6,499,929 B1
(45) Date of Patent: Dec. 31, 2002

(54) MATERIAL HANDLING SYSTEM FOR REDUCING DUST PARTICLES

(75) Inventors: George A. Salgado, Portland, OR (US); Charles H. Ramberg, Dayton, MN (US)

(73) Assignee: Columbia Grain Incorporated, Portland, OR (US)

( * ) Notice: Subject to any disclaimer, the term of this patent is extended or adjusted under 35 U.S.C. 154(b) by 2 days.

(21) Appl. No.: 09/675,036

(22) Filed: Sep. 28, 2000

(51) Int. Cl.⁷ ............................................... B65G 65/46
(52) U.S. Cl. ..................... 414/299; 198/369.1; 198/533; 198/536; 414/291; 414/328
(58) Field of Search .................... 414/291, 299, 414/301, 302, 328, 329, 397, 808; 198/369.1, 533, 536, 563

(56) References Cited

U.S. PATENT DOCUMENTS

| | | | |
|---|---|---|---|
| 2,456,308 A | 12/1948 | O'Brien | |
| 3,092,264 A | 6/1963 | Milek | |
| 3,747,811 A * | 7/1973 | Lewis et al. | 222/233 |
| 3,867,969 A | 2/1975 | Garnett | |
| 3,881,610 A | 5/1975 | Hessling | |
| 4,027,806 A * | 6/1977 | Weihmuller | 414/299 |
| 4,125,195 A | 11/1978 | Sasadi | |
| 4,182,591 A * | 1/1980 | Stanelle | 414/328 |
| 4,264,003 A | 4/1981 | Gill | |
| 4,284,380 A * | 8/1981 | Brumbaugh, Jr. et al. | 414/329 |
| 4,346,802 A * | 8/1982 | Popper | 198/533 |
| 4,460,308 A | 7/1984 | Moon et al. | |
| 4,558,724 A | 12/1985 | Carlsson | |
| 4,727,913 A | 3/1988 | Bliss | |
| 4,946,018 A * | 8/1990 | Binzen et al. | 198/536 |
| 5,427,491 A * | 6/1995 | Duffy et al. | 414/291 |
| 5,881,780 A * | 3/1999 | Matye et al. | 414/808 |
| 6,000,445 A | 12/1999 | Schuh | |
| 6,283,327 B1 * | 9/2001 | Rubtsov | 222/56 |

FOREIGN PATENT DOCUMENTS

| | | | | |
|---|---|---|---|---|
| DE | 478839 | * | 6/1929 | 414/301 |
| WO | 89/01453 | * | 2/1989 | 414/328 |

* cited by examiner

Primary Examiner—James W. Keenan
(74) Attorney, Agent, or Firm—Haugen Law Firm PLLP

(57) ABSTRACT

An elevated inverted cone product storage hopper having an enclosed volume with a central opening at the bottom. A dust-free transfer system removes and delivers stored product from the storage hopper through a hopper unloader. The unloader has a converging frustoconical transition body which continues from the inverted cone toward a bottom discharge port. An elongated delivery auger system coupled to the unloader comprises an elongated horizontal barrel having a delivery screw for rotation about its axis for moving product to a product delivery opening. A flexible enclosed delivery tube is coupled to the delivery opening, with the delivery tube having a compliant exterior shell for accommodating free axial length adjustment thereof. The hopper and the delivery auger are rotatable for positioning the auger barrel and enclosed delivery tube radially relative to the storage hopper.

3 Claims, 5 Drawing Sheets

MATERIAL HANDLING SYSTEM FOR REDUCING DUST PARTICLES

BACKGROUND OF THE INVENTION

The present invention relates generally to an improved product transfer and conveyor system, and more particularly to a transfer mechanism particularly adapted for use in combination with an elevated product storage hopper, such as, for example, those storage hoppers typically utilized to store grain, pulverulent solids, and/or other solids pending shipment to a different location or an ultimate destination. The features of the present invention provide for substantially dust-free transfer of the material, and hence the apparatus is highly desirable for use in various locations, including urban locations where dust discharge may be deemed unacceptable.

The utilization of elevated product storage hoppers has been a common practice in the agricultural business, with such storage hoppers being utilized in country elevator locations. The location of the hoppers is determined by the expedience of the business, with product transfers being made from the hopper to a transport vehicle such as a grain tank for railroad use, or a semi-trailer grain tank for over-the-road service. Both modes of transportation require transfer of the stored product from the hopper to the transit vehicle, with time as well as dust release being important factors.

SUMMARY OF THE INVENTION

The present invention expedites the dust-free transfer of materials such as grains from a storage hopper to a transient vehicle by means of a hopper unloading means which is operatively coupled to the hopper structure per se. The enclosed volume of storage hoppers is typically an external wall of circular or rectangular configuration, with a generally inverted cone comprising the bottom surface. The bottom surface will also be provided with a central opening for accommodating discharge of the stored material, as required. The hopper unloading mechanism of the present invention is designed to be operatively coupled to the bottom central opening of the storage hopper and indeed has a configuration which functions as a continuation of the inverted cone of the hopper.

The hopper unloading means comprises a transition body of generally frustoconical configuration with a top inlet in communication with the central bottom opening of the hopper, and also with a bottom discharge port. The bottom discharge port, in turn, delivers material to the inlet port of an elongated delivery auger system which is also dust-free in operation. The delivery auger system comprises a horizontally disposed enclosed barrel with an elongated axis and opposed ends, with a delivery screw mounted for rotation about the axis of the barrel. With the proximal end of the barrel receiving product from the transition body, the distal end portion, in turn, is provided with a flexible enclosed delivery tube which has a compliant exterior shell for accommodating free axial length adjustment. The flexible enclosed delivery tube provides a continuation of dust-free discharge directly into the transport enclosure.

As an additional feature, means are provided for adjustably rotating the hopper unloading means including the delivery auger about an axis extending generally through the product receiving opening adjacent the proximal end. In this manner, the delivery auger is arranged for selective radial positioning of the auger barrel and enclosed delivery tube so as to conveniently arrange for product discharge at precise locations. In the loading of large vessels, such as, for example, barges, boat hulls and the like, it is frequently necessary to load the vessel in a predetermined fashion in order to reduce the amount of stress in the vessel upon displacement due to loading. The selective positioning of the delivery tube is, of course, advantageous to accommodate this feature.

As a still further feature of the invention, the enclosed barrel for the auger system may be provided with an extension positioned generally along the barrel axis, and with the enclosed delivery tube being in turn coupled to the end of the barrel extension. Such an arrangement enhances the flexibility of application, and permits use in a wide variety of locations and applications.

Therefore, it is a primary object of the present invention to provide an enclosed hopper unloading means for use in combination with an elevated product storage hopper, with the unloading means being operatively coupled to the base of the hopper, and provided for adjustable rotation of the unloading means about the hopper axis.

It is yet a further object of the present invention to provide a dust-free transfer means for use in combination with transfer of product from a product storage hopper to a transport vehicle, and wherein the transfer means comprises a hopper unloading system arranged to receive product from the port or opening in the base of the storage hopper, and thereafter transported through the barrel of a delivery auger system into a flexible enclosed delivery tube which is positioned within the confines of the transport vehicle.

It is yet a further object of the present invention to provide an improved hopper unloading means for use in combination with a product storage hopper for delivering product from the hopper to a transport vehicle, and wherein the hopper unloading means receives product from the base of the hopper, and thereafter passes the product through an elongated delivery auger system to a remotely positioned enclosed delivery tube, with the arrangement further including a means for adjustably rotating the hopper unloading means so as to accommodate selective radial positioning of the auger barrel relative to the storage hopper.

Other and further objects of the present inventions will become apparent to those skilled in the art upon a study of the following specification, appended claims and accompanying drawings.

IN THE DRAWINGS

FIG. 1 is a schematic view, partially in section, illustrating a typical elevated product storage hopper positioned or located adjacent a truck or rail loading station, and with the product unloading means of the present invention being operatively coupled to the base of the product storage hopper, and further illustrating, in phantom, positions of the delivery auger system and enclosed delivery tube relative to a semi-trailer being loaded with grain from the product storage hopper;

DESCRIPTION OF THE PREFERRED EMBODIMENT

Figure 1:
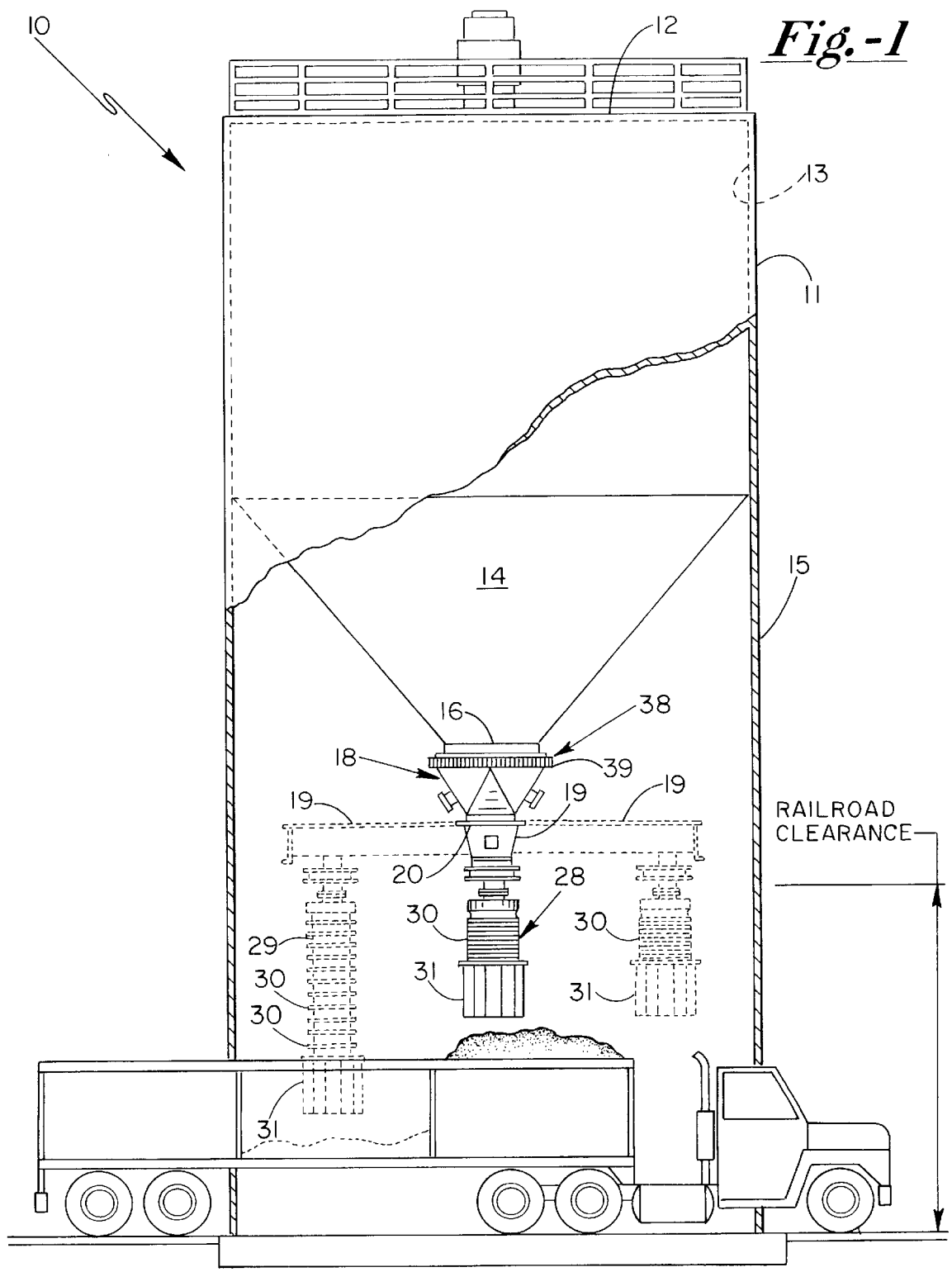
Figure 2:
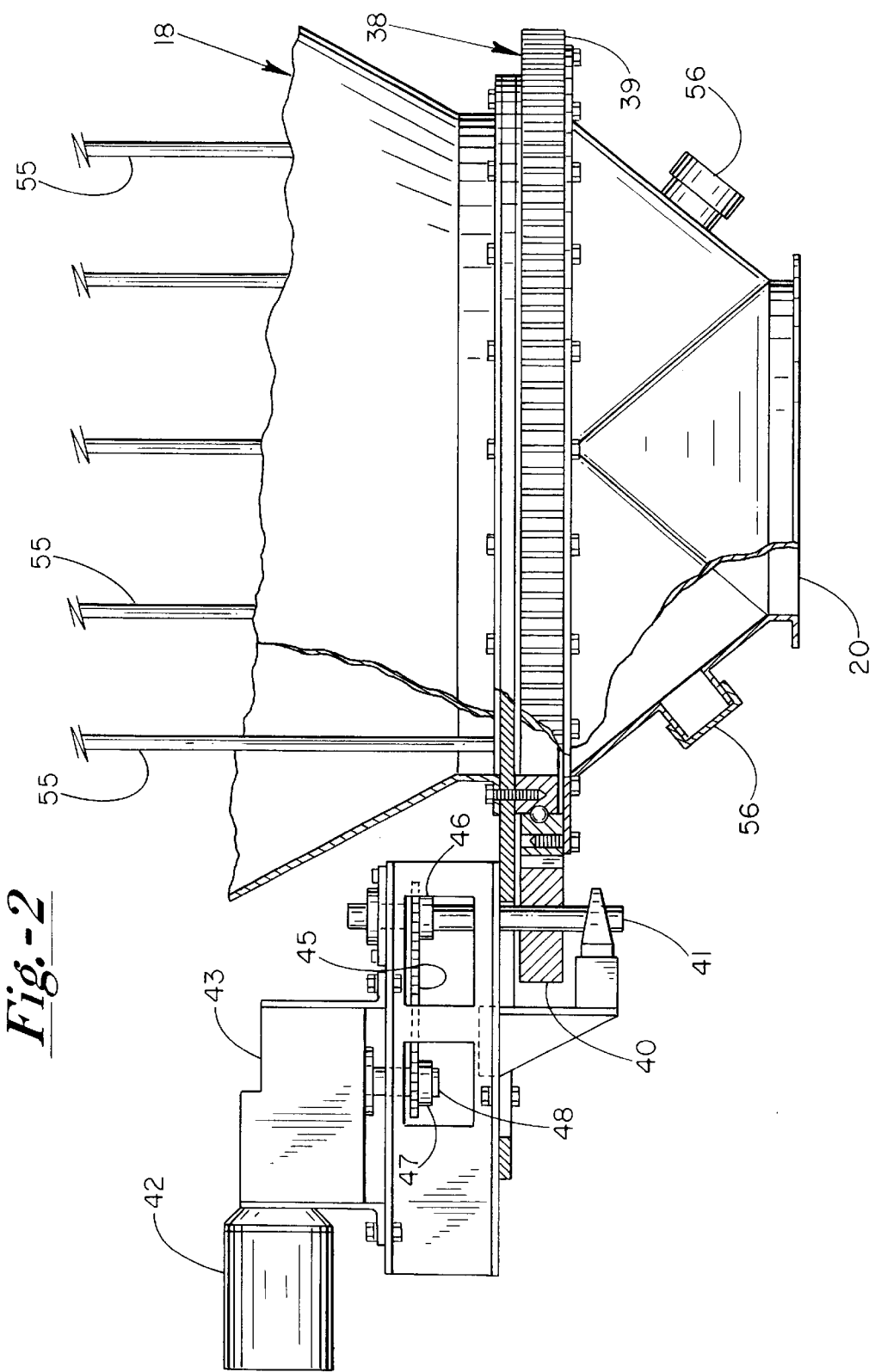
FIG. 2 is a fragmentary side elevational view, partially in section, and illustrating the transition body of the hopper unloading means, along with the drive mechanism for adjustably rotating the hopper unloading means relative to the storage hopper.
Figure 3:
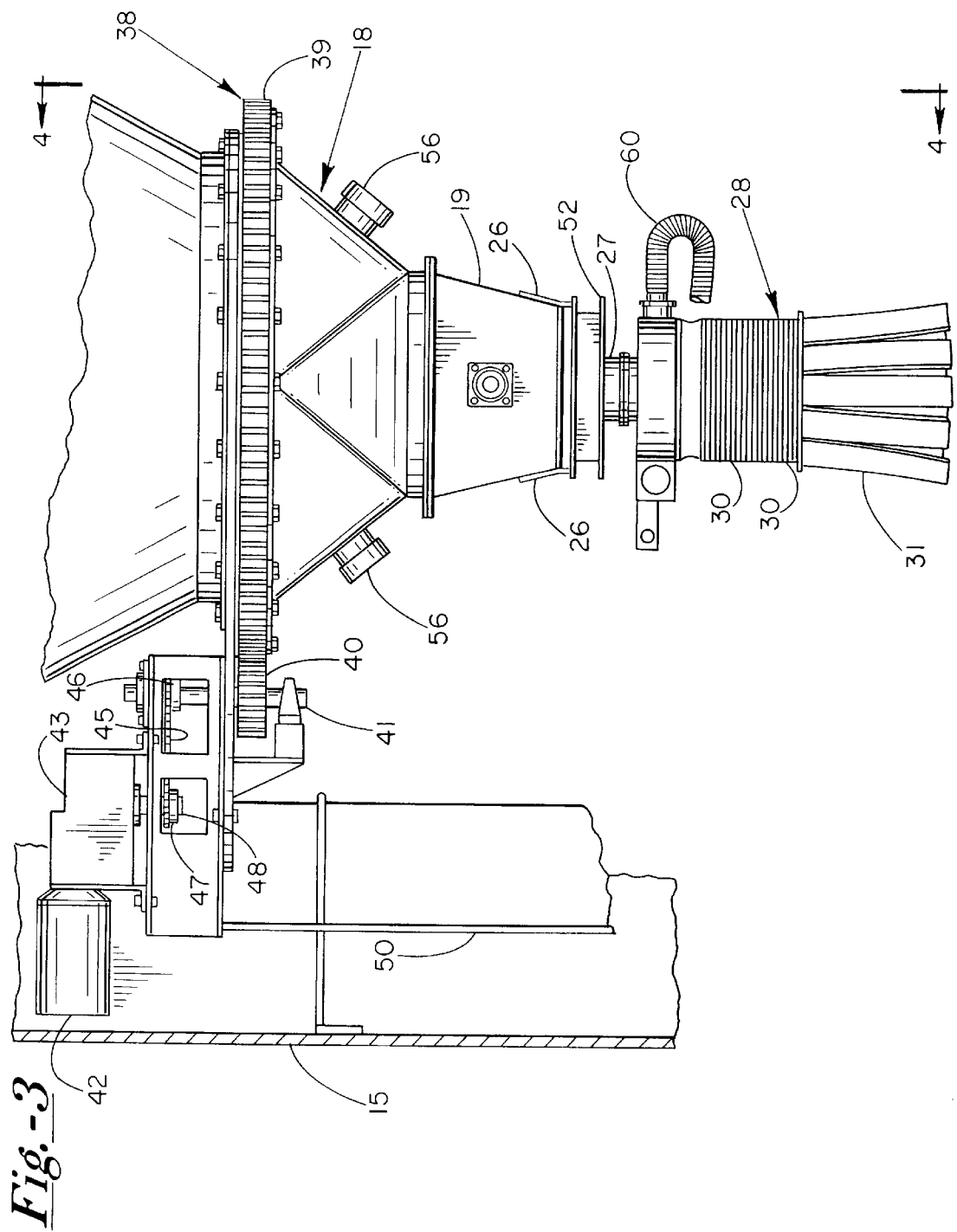
FIG. 3 is a view similar to FIG. 2 and illustrating, in addition, the mounting means for the rotary motion drive, and the arrangement of the flexible enclosed delivery tube coupled to the delivery auger system.

In accordance with the preferred embodiment of the present invention, and with particular attention being directed to FIG. 1 of the drawings, the elevated storage hopper generally designated 10 comprises a storage vessel 11 of generally circular cross-section, having a top closure 12, a cylindrical wall 13 along with a generally inverted cone 14 forming the bottom surface and being mounted on frame network 15. Inverted cone 14 has a central opening formed therein as at 16 to accommodate product flow from the storage hopper into the hopper unloading means. The hopper unloading means with transition tube is shown generally at 18, with this mechanism including a base elongated delivery auger system with a barrel member as at 19 (in phantom) with the delivery auger comprising a horizontally enclosed barrel as illustrated in detail in FIG. 4. At the proximal end of delivery auger barrel 19 there is positioned a product receiving opening 20 with barrel 19 further being provided with an auger screw as shown in the end view of FIG. 4. Delivery screw generally designated 22 is provided with the conventional axis or central shaft 23 along with a circumferential flute as at 24. Such augers are, of course, in common use to those of skill in the art. Delivery screw 22 is designed, of course, to rotate about its axis, with the screw axis being coincidental with the axis of barrel 19.

The distal end of delivery auger barrel 19 is provided with a delivery port as at 26, with port 26 including an extension element 27 coupled directly to a flexible enclosed delivery tube as at 28. Delivery tube 28 is provided with a compliant exterior shell as at 29 together with circumscribing rings as at 30 to permit the shell to accommodate free axial length adjustment and thus In accommodate flow to and through a variety of levels. The base of tube 28 is fitted with flaps as at 31 to complete the enclosed delivery system, with flutes or flaps 31 being flexible and adapted for flexure in a radial outward direction.

Means are provided for adjustably rotating the hopper unloading means shown generally at 38. The adjustable rotation means include ring gear 39 secured fast to the exterior of transition tube 18, with the teeth of ring gear 39 being in mesh with the teeth of pinion 40. Pinion 40 is rotatably mounted on shaft 41 and driven by motor 42 through appropriate linkage and gear box 43. Rotary motion is provided for pinion 40 through chain 45 coupled between sprockets 46 and 47 which are fast upon shafts 41 and 48 respectively. Shaft 48 is, in turn, driven through gear box or transmission mechanism 43.

Motor 42 is a reversible motor arranged for controllable actuation through appropriate remote switching (not shown), with such switching mechanisms being, of course, utilized in the art and known to those of conventional wisdom. It is noted further that the means for adjustably rotating the hopper unloading means shown at 38 includes a stationary mount as at 50 which is in turn secured to hopper support frame network 15. Thus, motor 42 along with its associated components through shaft 41 and pinion 40 are stationary and in place, with ring gear 39 being adapted for controlled rotatable motion about the axis of transition tube 18.

Figure 5:
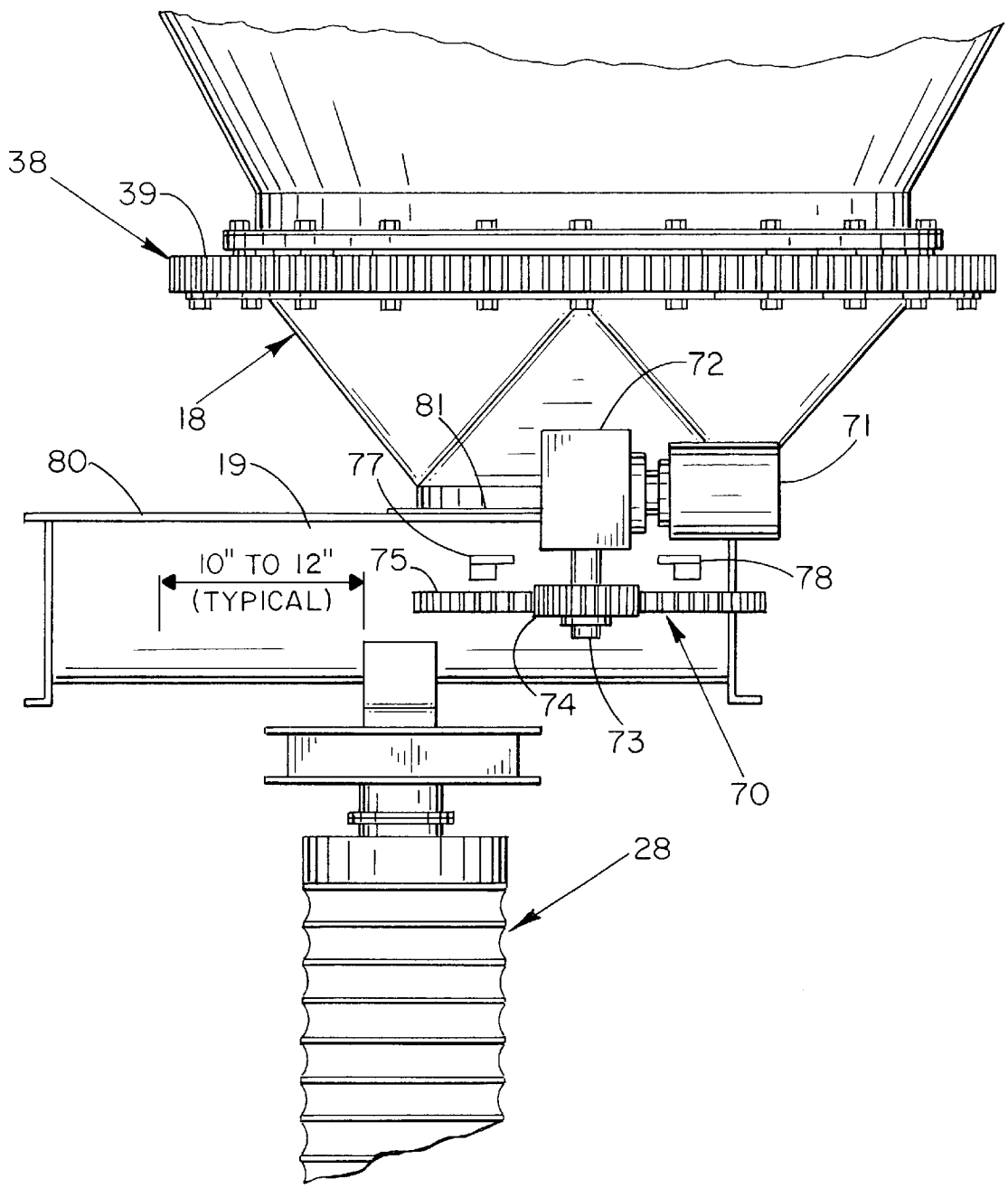
FIG. 5 is a schematic side elevational detail view of a typical mechanism for longitudinally extending and retracting the screw conveyor and delivery auger barrel.

As indicated in FIG. 5 and discussed hereinafter, means are provided for longitudinal motion of the enclosed flexible delivery tube 28. In this connection, delivery tube 28 is moved along a direction parallel to the axis of auger barrel 19 by means of a rack gearing mechanism as illustrated generally at 70. Alternatively, barrel 19 may be provided with a coaxial or telescoping extension which is, in turn, secured to delivery tube 28.

In order to provide for elimination or reduction of bridging within the confines of the converging conical openings, a plurality of elongated axially extending rods are provided as at 55, with rods 55—55 being, in turn, secured to the interior of transition tube 18 and arranged for rotational movement with the hopper unloading means. Typically, up to about twelve such vertically extending rods 55—55 will be provided, with the arrangement being such that rotational motion of the hopper unloader will, in turn, break up any bridging or agglomeration of product at the lower extreme end of the storage hopper.

Figure 4:
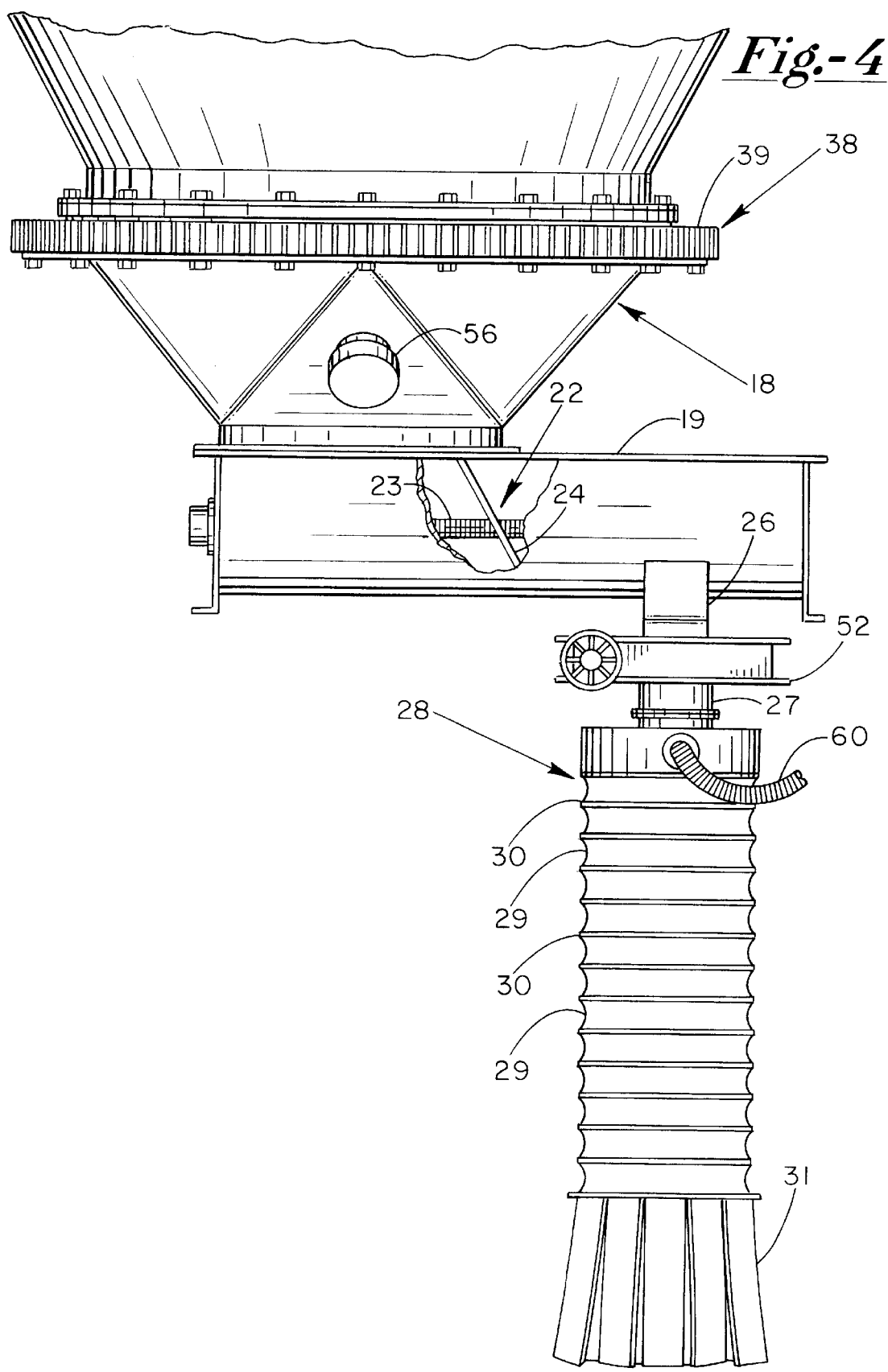
FIG. 4 is a front elevational view of the hopper unloading means, taken along the line and in the direction of the arrows 4—4 of FIG. 3 and showing, in addition, the elongated delivery auger system equipped with a means for motion of the flexible enclosed delivery tube along the axis of the barrel of the delivery auger system.

With attention being re-directed to FIG. 4, it will be observed that breather tube 60 is provided adjacent or along the upper end of enclosed delivery tube 28. This breather tube is, of course, in turn coupled to an appropriate filter means to assist in air transfer, and to further reduce introduction of dust into the ambience.

With attention now being directed to FIG. 5 of the drawings, a mechanism generally designated 70 includes a drive motor 71 with a gear reducer mechanism 72 operably attached thereto. Drive shaft 73 extends from a housing of reducer 72 and pinion drive gear 74 is fast thereto. Pinion 74 is in mesh with rack 75, with motor 71 being reversible so as to jog the conveyor in either direction. Limit switches 77 and 78 are provided to control the extent of lateral motion delivered to screw conveyor housing.

In a typical application, the extent of travel may be from about 12 to 18 inches, with greater amounts of travel being, of course, possible with appropriate design.

In order to further control and guide the motion of screw conveyor housing, radially positioned laterally extending slide rails such as at 80 and 81 are provided, with the slide rails being housed within a sealed cover.

In order to provide for appropriate inspection, when required, inspection ports 56—56 are provided in transition tube 18. These inspection ports are provided with removable caps for appropriate use in connection with the inspection ports.

It will be appreciated, therefore, that the scope of the present invention is not intended to be limited to the specific embodiment illustrated, but is set forth within the language of the appended and accompanying claims.

What is claimed is:

1. In combination with an elevated product storage hopper having an enclosed volume with a generally inverted cone with a central opening comprising the bottom surface thereof; dust-free transfer means for removal and delivery of stored product from said hopper, said transfer means comprising:
    (a) hopper unloading means operatively coupled to said bottom central opening and comprising a downwardly converging frustoconical transition body in substantial continuation with said inverted cone and with said transition body having a top inlet port in communication with said central opening and a bottom discharge port;
    (b) an elongated delivery auger system comprising a horizontally disposed enclosed barrel with an elongated axis and opposed proximal and distal ends, and having a delivery screw mounted therewithin for rotation about said axis and with a product receiving opening adjacent said proximal end and a product delivery opening at said distal end;

(c) a generally flexible enclosed delivery tube coupled to said distal end opening, said delivery tube having a compliant exterior shell for accommodating free axial length adjustment thereof;

(d) means for adjustably rotating said hopper unloading means and said delivery auger system about said storage hopper for accommodating selective radial positioning of said enclosed barrel and enclosed delivery tube relative to said storage hopper; and (e) said hopper unloading means includes a plurality of radially displaced product agitating rods extending axially upwardly into the inverted cone of said storage hopper, with said rods being coupled to said frustoconical transition body mounted for arcuate rotation therewith.

2. The apparatus of claim 1 where the axial position of said enclosed delivery tube along said enclosed barrel is adjustable.

3. The apparatus of claim 1 wherein said adjustable rotating means comprises a ring gear operatively secured to the outer circumference of said frustoconical transition body and including a drive pinion mounted on a stationary axis and in mesh with said ring gear for rotating said ring gear relative to said storage hopper.

* * * * *